United States Patent
Gang et al.

[11] Patent Number: 5,918,280
[45] Date of Patent: Jun. 29, 1999

[54] ANGULAR RATE SENSING DEVICE

[75] Inventors: Lin Gang, Kariya; Yoshihiro Naruse, Katiya; Takahiro Yamada, Yamagata-gun, all of Japan

[73] Assignee: Aisin Seiki Kabushiki Kaisha, Kariya, Japan

[21] Appl. No.: 08/902,551

[22] Filed: Jul. 29, 1997

[30] Foreign Application Priority Data

Jul. 29, 1996 [JP] Japan .................................. 8-198913
Sep. 20, 1996 [JP] Japan .................................. 8-249822

[51] Int. Cl.⁶ ....................................................... G01P 9/04
[52] U.S. Cl. ........................................ 73/504.12; 73/1.37
[58] Field of Search .......................... 73/504.12, 504.14, 73/504.15, 504.16, 579, 1.37

[56] References Cited

U.S. PATENT DOCUMENTS 5,349,855  9/1994  Bernstein et al. .................... 73/504.16
5,780,740  7/1998  Lee et al. ............................... 73/504

FOREIGN PATENT DOCUMENTS

7-43166  of 1995  Japan .

*Primary Examiner*—John E. Chapman
*Attorney, Agent, or Firm*—Sughrue, Mion, Zinn, Macpeak & Seas, PLLC

[57] ABSTRACT

Angular rate sensor comprises a x-direction oscillator, a x-oscillation driver, a z-oscillation sensing element for detecting an angular rate and an additional z-oscillation driver for triggering a free damped oscillation of the oscillator in the z-direction. An electric sensing circuit energizes the z-oscillation driver for triggering the free damped oscillation and detects the frequency of the free damped oscillation. The frequency is the resonant frequency of the oscillator. Thereafter the electric sensing circuit energizes the x-oscillation driver with the detected frequency for detecting the angular rate.

11 Claims, 10 Drawing Sheets

ANGULAR RATE SENSING DEVICE

FIELD OF THE INVENTION

The invention relates to an angular rate sensing device having an angular rate sensor and an electric circuit device for converting an electric signal which is generated by the sensor to an angular rate signal which represents an angular rate $\Omega$ of rotation about y-axis. The sensor has electrodes which drive an oscillator for oscillation in x-direction and which detect components of oscillation of the oscillator occurring in response to the angular rate $\Omega$ of rotation about the y-axis which is orthogonal to the direction of oscillation x, appearing in z-direction which is orthogonal to the x-direction and also to the y-axis.

BACKGROUND OF THE INVENTION

An example of the angular rate sensor of the kind described is disclosed in U.S. Pat. No. 5,349,855 entitled "COMB DRIVE MICROMECHANICAL TUNING FORK GYRO". Another example is disclosed in Japanese Laid-Open Patent Application No. 43,166/95 entitled "ANGULAR RATE SENSOR". Each of these examples is a microgyro obtained by a micromachining of silicon using a semiconductor processing process.

An angular rate sensor of the kind described includes an oscillator in the form of a flat plate disposed in an x-y plane and having two sets of comb tines, each set disposed on a lateral end or a side extending parallel to the y-axis, with pairs of support limbs extending in the y-direction from the respective longitudinal ends or sides extending parallel to the x-axis, the limbs supporting the plate oscillator in a suspended manner to permit its oscillation in x- and z-direction. A first and a second set of stationary comb tines are disposed on the outside of the lateral ends of the oscillator in an interdigitated manner with the first and the second set of comb tines on the oscillator while avoiding a contact therebetween and maintaining a microgap therebetween. An a.c. voltage of a frequency f is applied across the oscillator and the first and the second set of stationary comb tines so that the oscillator is alternately attracted by the electrostatic attraction from the first and the second set of stationary comb tines for oscillation in the x-direction at the frequency f.

When an angular rate of rotation about the y-axis is applied to the oscillator while the latter is oscillating in the x-direction, Coriolis force is applied to the oscillator, which then undergoes an elliptical motion comprising the oscillation in the x-direction on which an oscillation in z-direction is superimposed. Thus an oscillation in the z-direction appears in the oscillator. An electrode is disposed in opposing relationship with the oscillator with a microgap therebetween and has a capacitance which varies in accordance with the oscillation in the z-direction. The variation has an amplitude which is approximately inversely proportional to the amplitude of the oscillation of the oscillator in the z-direction. By converting the capacitance thus determined into a corresponding electrical signal level or analog voltage, which represents a capacitance detection signal, there is obtained a voltage having an amplitude which is inversely proportional to the amplitude of the oscillator in the z-direction. Since this amplitude corresponds to the value of the angular rate, a synchronized detection of the capacitance detection signal in synchronism with an exciting signal applied to the oscillator allows a d.c. voltage having a level which corresponds to the value of the angular rate to be obtained.

Representing the mass of the oscillator by m, the amplitude of the oscillation by a, the period by $\omega$ and the angular rate by $\Omega$, a maximum value of the rate of oscillation is given by a $\omega$. Accordingly, the Coriolis force Fc has a maximum value Fcmax, which is defined as follows:

$$F\text{cmax} = 2m\,\Omega\,a\,\omega$$

The Coriolis force Fc has a magnitude which is proportional to both a and $\omega$. However, for a microgyro, a range over which $\omega$ is varied is limited by the structure of the microgyro. Accordingly, a Coriolis force Fc having an increased magnitude is developed by increasing the amplitude a. In order to generate the Coriolis force Fc most efficiently, an electrical drive circuit is designed to drive the oscillator for oscillation at its resonant frequency. Due to manufacturing errors, however, the resonant frequency varies from oscillator to oscillator, requiring a tuning of the drive circuit for each angular rate sensor. However, the smaller the size of the sensor, the greater the manufacturing errors or the variation, whereby a difficulty is involved in the tuning.

In addition, the oscillation of the oscillator tends to be unstable due to the oscillations of the resonant frequency in the x-and y-directions and due to a change of the resonant frequency with the passage of time. It is difficult to accommodate the tuning to the change of the resonant frequency with the passage of time from power ON or after a long usage of the sensor.

The angular rate sensor disclosed in the Japanese Laid-Open Patent Application No. 43,166/95 has a gap at an end of a support member for supporting an oscillator. An electrode is disposed at the gap. An electric voltage is applied across the support member and the electrode. The gap is adjusted for maximizing an amplitude of the oscillator at a design frequency by adjusting a level of the electric voltage. However, a range of the adjustment of the level is relatively narrow. Thus the adjustment is insufficient to the manufacturing errors or the change of the resonant frequency with the passage of time. Since an actual resonant frequency of the oscillator is unknown, a frequency of an oscillation drive signal which is generated in an electric drive circuit for energizing the oscillator can not be adjusted to the actual resonant frequency.

SUMMARY OF THE INVENTION

The invention has for its first object the provision of an angular rate sensing device having a high sensitivity and high accuracy of detection of an angular rate, and has for its second object facilitating a detection of the actual resonant frequency of the oscillator.

In accordance with the invention, an angular rate sensing device comprises: an angular rate sensor having a base an oscillator supported by the base so as to be oscillatable in x- and z-directions, a first driving means for driving the oscillator for oscillation in the x-direction, a second driving means for driving the oscillator for oscillation in the z-direction, and oscillation converting means for generating a first electric signal (input of 31, 32) whose level oscillates in accordance with the oscillation in the z-direction;

synchronizing signal generating means for generating a synchronizing signal of an indicated frequency;

a first exciting means for supplying a first energizing voltage which is synchronized with the synchronizing signal to the first driving means;

a second exciting means for supplying a second energizing voltage to the second driving means for driving the oscillator in the z-direction;

amplitude detecting means for generating a second electric signal which indicates an amplitude of a change of a level of a signal component which has a frequency of substantially the same with that of the synchronizing signal and which is in the first electric signal; and frequency searching means for supplying the second energizing voltage to the second driving means through the second exciting means and for detecting frequency of the first electric signal which is generated by the oscillation converting means.

In accordance with the invention, the frequency searching means detects a resonant frequency of an oscillation of the oscillator in the z-direction. When generation of the synchronizing signal of the resonant frequency is indicated to the synchronizing signal generating means, the oscillator oscillates in the x-direction with the resonant frequency. When an angular rate about the y-axis is applied while the oscillator is oscillating in the x direction, the oscillator undergoes an elliptical motion, depicting an ellipse in x-z plane. Thus, a z-oscillation component appears in addition to the x-oscillation component. The amplitude of the first electric signal corresponds to the amplitude of the z-oscillation component. The level of the second electric signal which is generated by the amplitude detecting means corresponds to the amplitude of the z-oscillation component which corresponds to the angular rate. Since the z-oscillation component oscillates with the resonant frequency, the amplitude of the z-oscillation is greater than that of different frequency. Thus the detection of the angular rate becomes high and the resolution or the accuracy of the angular rate detection is high.

Other objects and features of the invention will become apparent from the following description of several embodiments with reference to the drawings.

DESCRIPTION OF THE PREFERRED EMBODIMENTS

First Embodiment

Figure 1:
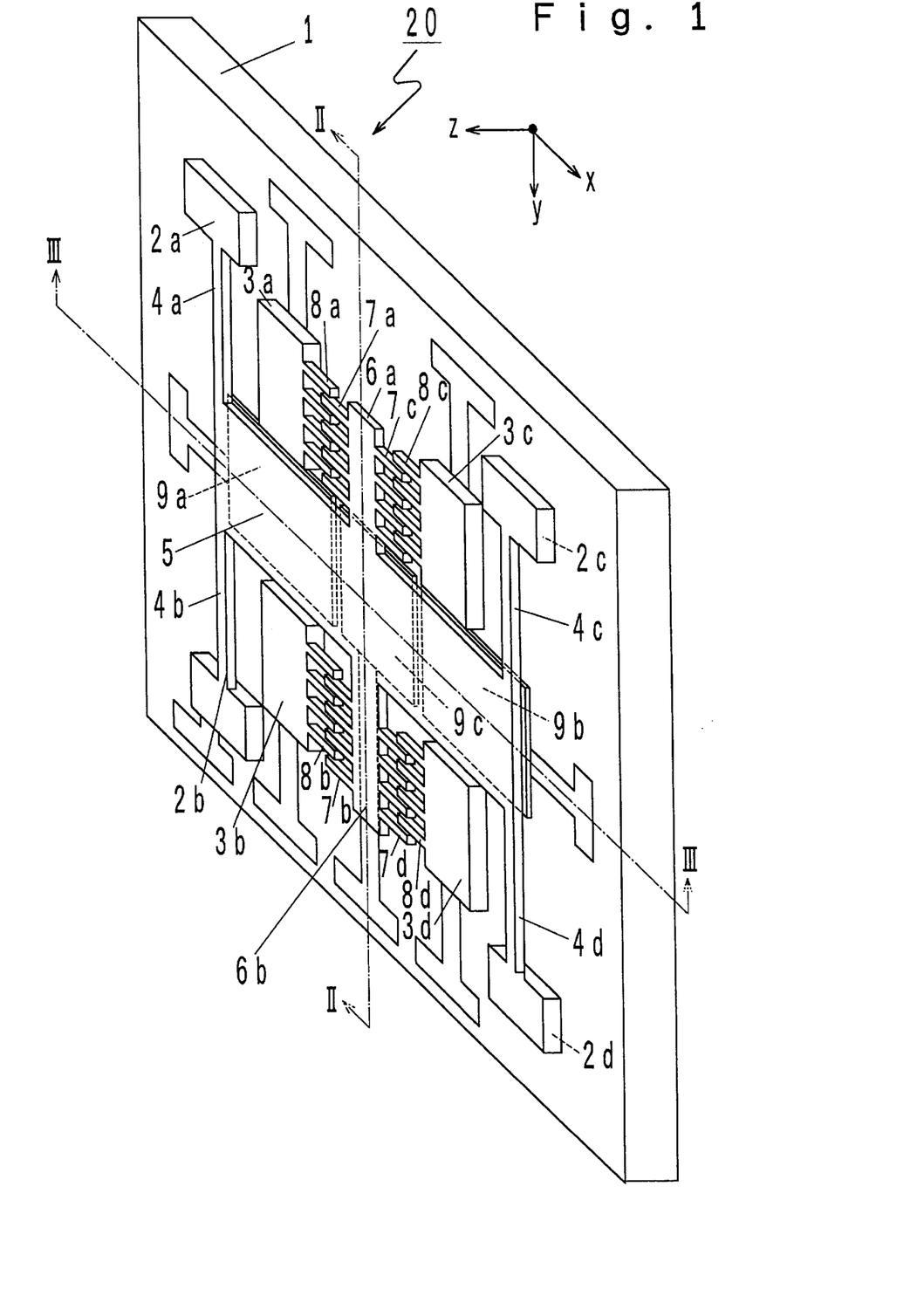
FIG. 1 is a perspective view of a first embodiment of the invention.

Referring to FIG. 1 which shows a microgyro or angular rate sensor according to a first embodiment of the invention, a silicon substrate 1 provided as an insulator is formed with plate oscillator anchorages 2a to 2d and drive electrode anchorages 3a to 3d, which are formed by polysilicon containing an impurity to make them electrically conductive.

Oscillator support beams 4a, 4b extending in an y-direction on a line continue to the anchorages 2a, 2b. Similarly oscillator support beams 4c, 4d extending in the y-direction on a line continue to the anchorages 2c, 2d.

An oscillator 5 extending in an x-direction and substantially parallel to the surface of the substrate 1 continues to the support beams 4a to 4d. Electrodes 9a, 9b for forming capacitances and a z-drive electrode 9c for oscillating the oscillator 5 in the height direction (z) are disposed on a surface of the substrate 1, the surface opposed to the oscillator 5.

Electrode stems 6a, 6b extend in the y-direction from the center of the oscillator 5.

A plurality of moving electrodes or x-movement electrodes 7a, 7b and 7c, 7d in the form of comb tines distributed at an equal pitch in the y-direction extend to the left and to the right from the stems 6a, 6b in the x-direction.

Each of the drive electrode anchorages 3a to 3d is integrally formed with a plurality of stationary electrodes or x drive electrode 8a to 8d respectively, in the form of comb tines in an interdigitated manner with the x-movement electrodes 7a to 7d, respectively, extending from the stems 6a, 6b so as to move into slots defined between the comb tines formed by the x-movement electrodes. In this manner, microgaps are formed between the x drive electrodes 8a to 8d and the x-movement electrodes 7a to 7d.

It is to be noted that the support beams 4a to 4d, the oscillator 5, the electrode stems 6a, 6b, the x-movement electrodes 7a to 7d and the x drive electrodes 8a to 8d are spaced from the surface of the substrate 1, and thus they oppose the surface of the substrate 1 with gaps therebetween. All of these members or elements which are spaced from the surface of the substrate 1 are formed in an integral and continued manner with the oscillator anchorages 2a to 2d and the drive electrode anchorages 3a to 3d, as the anchorages are formed on the surface of the silicon substrate 1 by evaporation of the micromachining technique, as will be described below.

Starting with the substrate 1 on the surface of which the electrodes 9a, 9b for forming a capacitances and the z-drive electrode 9c are already formed, a first mask layer is formed on the surface of the substrate 1 at locations below the support beams 4a to 4d, the oscillator 5, the electrodes stems 6a, 6b, x-movement electrodes 7a to 7d and the x drive electrodes 8a to 8d. After the first mask layer is formed on the surface of the substrate 1, the first mask layer is etched away at locations below the anchorages 2a to 2d and 3a to 3d.

Figure 2:
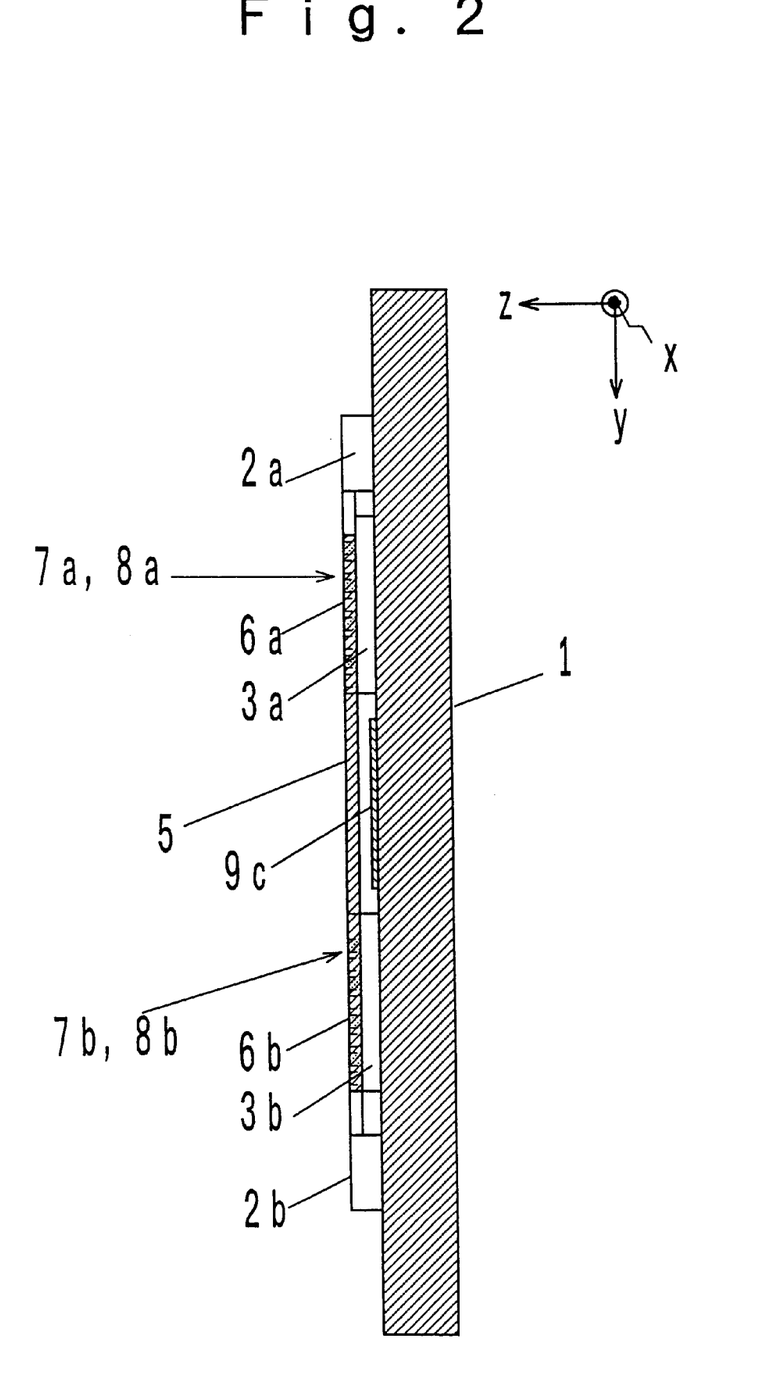
FIG. 2 is a cross section of a gyro 20 shown in FIG. 1, taken along the line II—II shown in FIG. 1.
Figure 3:
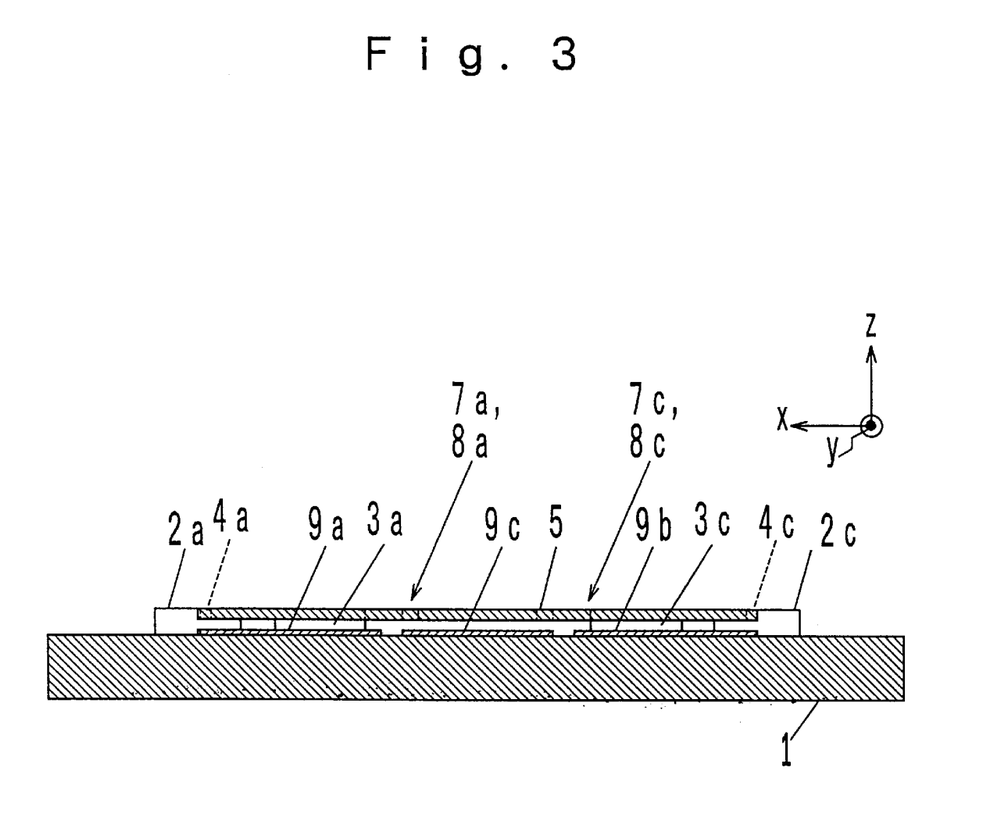
FIG. 3 is a cross section of the gyro 20 shown in FIG. 1, taken along the line III—III shown in FIG. 1.

A fabrication layer is then deposited on the surface of the substrate 1, and a silicon vapor containing an impurity which makes the depositions conductive are evaporated over the entire surface of the substrate 1, and the first mask layer and the despositions outside of the anchorages 2a to 2d and 3a to 3d, the support beams 4a to 4d, the oscillator 5, the electrode stems 6a, 6b, x-movement electrode 7a to 7d and the x-drive electrodes 8a to 8d are etched away. Then appear individual elements or members on the substrate 1 as shown in FIGS. 1 to 3.

The anchorages 2a to 2d, 3a to 3d and the electrodes 9a to 9c are connected to an electric circuit or lead electrodes on the substrate 1 with electric leads which are deposited on the substrate 1 with a predetermined pattern.

Referring to FIG. 1, when a high voltage is applied across the anchorage 3a, 3b (x-drive electrode 8a, 8b) and the anchorages 2a to 2d (oscillator plate 5) from the exterior of the microgyro 20 through the lead electrodes, the electrostatic force acting therebetween causes the oscillator 5 to move toward the anchorages 3a, 3b. On the other hand, when a high voltage is applied across the anchorages 3c, 3d (x-drive electrodes 8c, 8d) and the anchorages 2a to 2d (oscillator 5), the electrostatic force acting therebetween causes the oscillator 5 to move toward the anchorages 3c, 3d. When these two modes of voltage application alternately repeats, it follows that the oscillator 5 oscillates reciprocatively in the x-direction. If an angular rate $\Omega$ about the y-axis is applied to the oscillator 5 during such oscillation, the resulting Coriolis force causes the oscillator 5 to undergo an elliptical motion in a plane parallel to the x-z plane about the y axis in which a reciprocatory motion in the z-direction is superimposed upon a reciprocatory oscillation in the x-direction.

If the angular rate $\Omega$ is not applied to the oscillator 5, the capacitance between the oscillator 5 and the electrodes 9a, 9b does not vary in spite of the oscillation in the x-direction. When the angular rate $\Omega$ is applied to the oscillator 5, the capacitance between the osillator 5 and the electrodes 9a, 9b varies with an amplitude which corresponds to the z-oscillation component of the oscillator 5. Thus it is possible to determine the angular rate $\Omega$ by measuring the amplitude of the variation of the capacitance between the oscillator 5 and the electrodes 9a, 9b.

If the frequency of the elliptical oscillation of the oscillator 5 coincides with a resonant frequency of the oscillator 5, a variation of the amplitude of the z-oscillation component of the oscillator 5 corresponding to a variation of the angular rate $\Omega$ is high. This means that a resolution of the angular rate detection is high.

Figure 4:
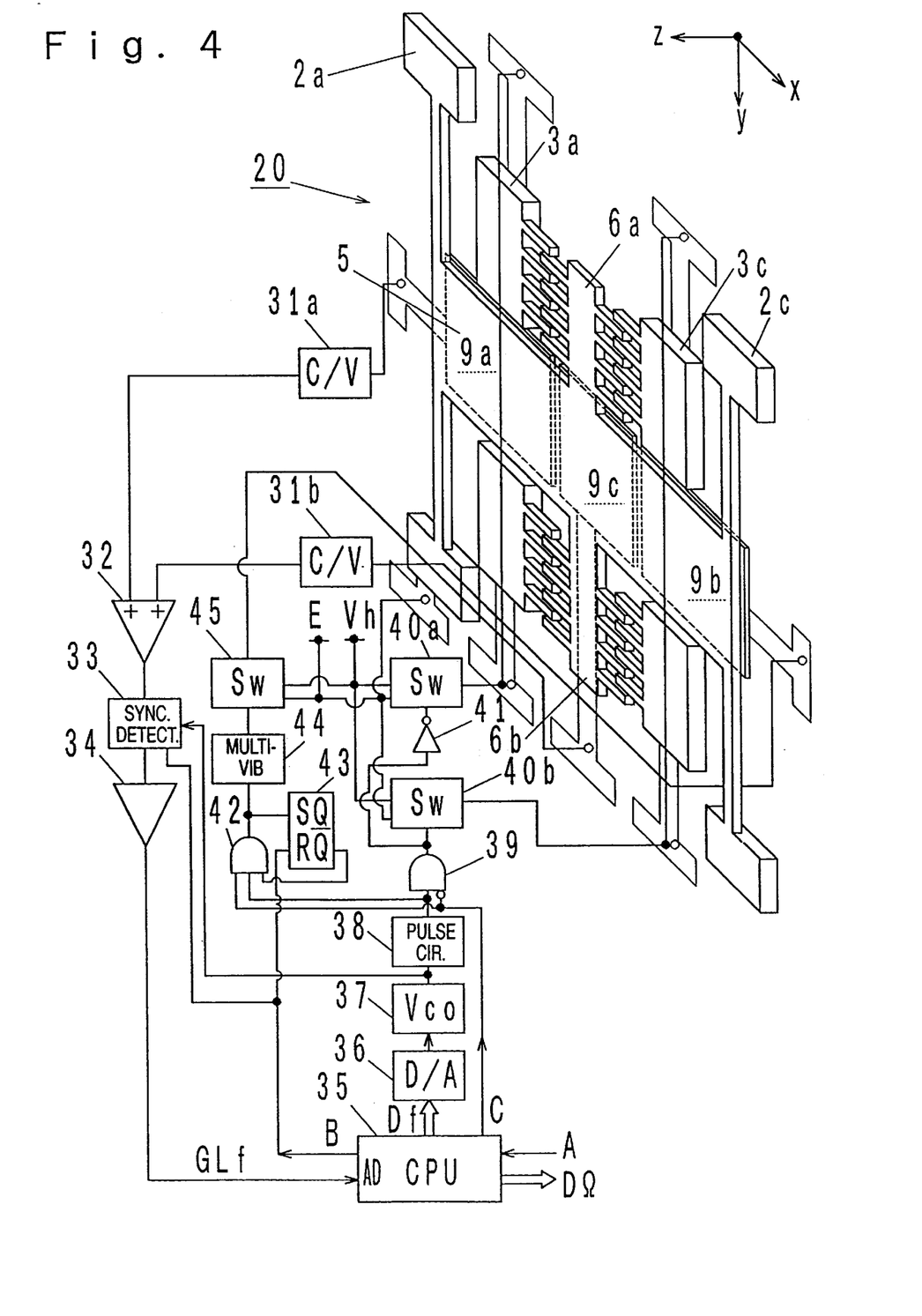
FIG. 4 is a block diagram of an electric circuit which is connected to the gyro 20 shown in FIG. 1.

Referring to FIG. 4 which shows an electric circuit connected to the gyro 20 as described above, an output of a high voltage switching circuit 40a is connected to the anchorages 3a, 3b (x-drive electrodes 8a, 8b), whereas an output of a high voltage switching circuit 40b is connected to the anchorages 3c, 3d (x-drive electrodes 8c, 8d). The electrodes 9a and 9b for forming a capacitance with the oscillator 5 respectively are connected to C/V converters 31a and 31b, respective one of which generates a capacitance signal, the level of which corresponds to the capacitance between the electrode 9a or 9b and the oscillator 5. The z-drive electrode 9c is connected to an output of a high voltage switching circuit 45.

A D/A converter 36 converts data Df indicating a frequency to an analog signal, the level of which corresponds to the frequency indicated. The data Df is supplied by a microcomputer (hereinafter referred to as CPU) 35, and the analog signal is supplied to a voltage controlled oscillator (hereinafter referred to as Vco) 37, which generates a sine wave signal of a frequency Df indicated by the analog signal and of a constant level. The sine wave signal is supplied to a pulse forming circuit 38 which generates a pulse signal, the level of which is high H at positive interval of the sine wave and low L at negative interval. The pulse signal is supplied to AND gates 39 and 42.

In an angular rate detection mode of operation, the CPU 35 applies a mode indication signal C of low level L to the AND gates 39 and 42. The AND gate 39 turns ON responding to the signal C of level L whereas the AND gate 42 turns OFF. The CPU 35 measures the angular rate and supplies out detected data D $\Omega$ in the angular rate detection mode, in which the pulse signal generated by the pulse forming circuit 38 is applied to the switching circuit 40b and to an inverter 41 which in turn applies to the switching circuit 40a an inverted pulse signal, the phase of which is varied by 180° from the pulse signal generated by the pulse forming circuit 38. The switching circuit 40a, after a short delay from a rising up of the level of the inverted pulse signal, applies a high voltage Vh of a high voltage source which is not shown in FIG. 4 to the anchorages 3a, 3b (x-drive electrodes 8a, 8b). The switching circuit 40a interrupts the high voltage Vh and applies a basic potential (ground potential of the high voltage source) E to the anchorages 3a, 3b immediately at a fall of the level of the inverted pulse signal. The switching circuit 40b operates similarly with the switching circuit 40a. However, since there is a phase difference of 180° between the pulse signals applied to the switching circuits 40a and 40b, the high voltage Vh is applied to the anchorages 3a, 3b and 3c, 3d alternately whereby the oscillator 5 oscillates in the x-direction, the frequency of the oscillation is Df.

If an angular rate $\Omega$ is applied to the oscillator 5 during such oscillation, the oscillator 5 oscillates with the elliptical motion, the z-oscillation component of which undergoes an oscillation of the capacitances between the oscillator 5 and the electrodes 9a, 9b. The capacitance detection signals (analog voltage) generated by the C/V converters 31a, 31b oscillate in synchronism with the oscillation of the capacitances. An adder 32 supplies out a voltage, the level of which indicates a sum of the capacitance detection signals, to a synchronized detector 33. The sine wave signal generated by the Vco 37 is also applied to the synchronized detector 33 as a synchronization signal.

The synchronized detector 33 generates an analog angular rate detection signal which indicates an amplitude of the output a.c. signal of the adder 32. The frequency of the a.c. signal is Df, and the amplitude of the a.c. signal corresponds to the angular rate $\Omega$. The level of the angular rate detection signal generated by the detector 33 corresponds to the angular rate $\Omega$. In the synchronized detector 33, a phase shifter which is not shown in FIG. 4 shifts a phase delay to the sine wave signal supplied from the Vco 37. The phase delay is substantially the same with a phase delay (about 90°) between the sine wave signal and the capacitance detection signals generated by the C/V converters 31a, 31b. A mixer which is not shown in FIG. 4 detects the capacitance detection signals (output of the adder 32) in synchronism with the phase shifted sine wave signal. Thus the angular rate detection signal is generated. A low pass filter (not shown) in the synchronized detector 33 having a reset or clear function smoothes the angular rate detection signal. Smoothed output signal of the low pass filter is an angular rate signal.

The angular rate signal which is supplied out from the synchronized detector 33 is calibrated through an amplifier 34 to an angular rate signal GLf, the level of which is proportional to the angular rate $\Omega$. The calibrated angular rate signal GLf is applied to an A/D conversion port of the CPU 35 which converts the signal GLf to digital data D $\Omega$ which is stored in a memory in the CPU 35 and supplied out.

In a resonant frequency detection mode of operation, the CPU 35 inverts the level of the signal C to high H for turning the AND gates 39 and 42 OFF and ON respectively.

In the resonant frequency detection mode, the AND gate 39 does not supply the pulse for applying the high voltage Vh to the x-drive electrodes 8a to 8d. The potential of the electrodes 8a to 8d is the basic potential (ground). Thus the oscillator 5 does not oscillate in the x-direction. However, the Vco 37 generates the sine wave signal of a frequency Df which is indicated by the CPU 35. The pulse signal which is generated by the pulse forming circuit 38 is applied to AND gates 39 and 42. In addition, the C/V converters 31a, 31b, the adder 32, the synchronized detector 33 and the amplifier 34 operate as described hereinbefore with respect to the angular rate detection mode. If the oscillator 5 oscillates in the z-direction, a signal (the angular rate signal GLf as above described) is applied to the CPU 35.

When the CPU 35 issues a reset signal B (pulse), the low pass filter in the synchronized detector 33 is cleared. Namely a remaining voltage on the smoothing capacitor in the low pass filter is discharged to the basic potential (ground). At the same tine, a flip-flop 43 being resetted with the reset signal B inverts a signal level at Q bar output from L to high H. Since the output C of the CPU 35 is high H, the pulse signal (high H) passes through the AND gate 42 and is applied to a monostable multivibrator 44 and to the flip-flop 43. The flip-flop 43 being triggered by the pulse signal inverts a signal level at Q output from high H to low L which turns OFF the AND gate 42. By this operation of the flip-flop 43, a single pulse of high H is applied to the multivibrator 44 once after the output of the reset pulse B and during the time when the output of the pulse forming circuit 38 is high H. The multivibrator 44 being triggered by the single pulse applies a pulse of high H of a predetermined duration to a switching circuit 45.

The switching circuit 45 applies the high voltage Vh to the z-drive electrode 9c during the predetermined duration, and applies the basic potential (ground) to the z-drive electrode 9c when the output of the multivibrator 44 is low L. Thus the z-drive electrode 9c attracts the oscillator 5 in the z-direction by once in response to the reset signal B. At the release of the attraction, the oscillator 5 flits back and oscillates in a free damped oscillation mode in the z-direction with a resonant frequency (characteristic frequency).

Since the sine wave signal of the frequency Df which is generated by the Vco 37 is applied to the synchronized detector 33, the angular rate signal GLf rises up to a high level when the frequency Df coincides with the resonant frequency of the oscillator 5. However, when the frequency Df differs from the resonant frequency and the phase difference of the frequencies is extended, the output of the mixer in the synchronized detector 33 is an a.c. signal due to the phase difference between the capacitance detection signals (input of the adder 32) and the sine wave signal (synchronizing signal). The low pass filter in the synchronized detector 33 interrupts the a.c. signal. Thus the output of the synchronized detector 33 (the angular rate signal GLf) is extremely low or substantially null. When the frequency Df approaches to the resonant frequency (the frequency of the free damped oscillation) of the oscillator 5, the level of the angular rate signal GLf rises. Accordingly, the resonant frequency of the oscillator 5 is determined by incrementing the frequency Df by dF sequentially from a low limit value of a predetermined range of frequency which includes the resonant frequency of the oscillator, applying a single reset pulse B to the synchronized detector 33 and the flip-flop 43 after the increment of the frequency Df by dF for oscillating the oscillator 5 in the free damped oscillation mode, and converting for reading the angular rate signal GLf at a timing after several cycles of the free damped oscillation in one time of the oscillator 5. A frequency RF at a maximum peak of the angular rate signal GLf (data D Ω) is at or near the resonant frequency of the oscillator 5.

When a precise determination of the resonant frequency is desired, a second narrow range of frequency, a center of which is the frequency RF at the maximum peak of the signal GLf, is determined. Then the frequency Df is incremented by a value which is smaller than the dF and a frequency which provides a maximum peak to the signal GLf is determined with the same manner described above.

The CPU 35 provides the mode indication signal C (L:angular rate detection mode, H: resonant frequency detection mode) to the AND gates 39, 42. The CPU 35, in the angular detection mode (C=L), converting and reading periodically the output angular rate signal GLf of the amplifier 34, sets to an output port digital data D Ω which represent-the signal GLf for supplying the data D Ω to a host CPU which is not shown in FIG. 4. The host CPU can read the data D Ω at anytime. The host CPU provides an instruction signal A which indicates use/disuse of the angular rate data D Ω. The CPU 35 responding to a level low L (use) of the signal A, supplies out the mode indication signal C of low L (angular rate detection mode) converts and reads periodically the signal GLf and sets the data D Ω to the output for supplying the data to the host CPU. The CPU 35 responding to a level H (disuse) of the signal A, inverts the level of the signal C to high H (resonant frequency detection mode) then determines the resonant frequency RF as described above. The CPU 35 supplies the data Df which indicates the resonant frequency RF to the D/A converter 36 at the time when the level of the signal A inverts from H to L (angular rate detection mode).

Figure 5:
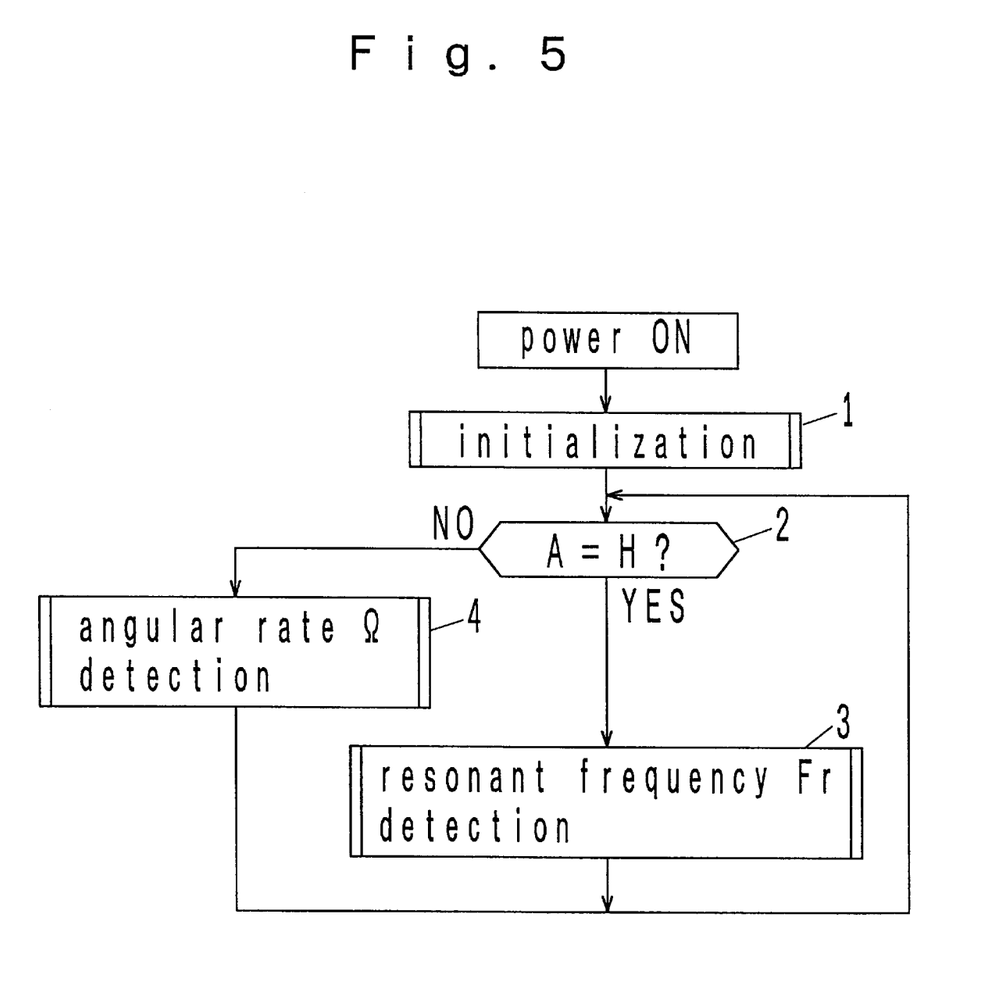
FIG. 5 is a flow chart of the operation of CPU 35 shown in FIG. 4.

Referring to FIG. 5 which shows a gist of operation of the CPU 35, when a constant voltage is applied to CPU 35, the latter executes an initialization, thus setting up signal levels to input/output ports, clearing timers, counters and registers in CPU 35 (step 1).

After the initialization, CPU 35 examines the level of the signal A from the host CPU. If the level is high H, CPU 35 executes "resonant frequency Fr detection" (step 3). However if the level is low L, CPU 35 executes "angular rate Ω detection" (step 4).

Figure 6:
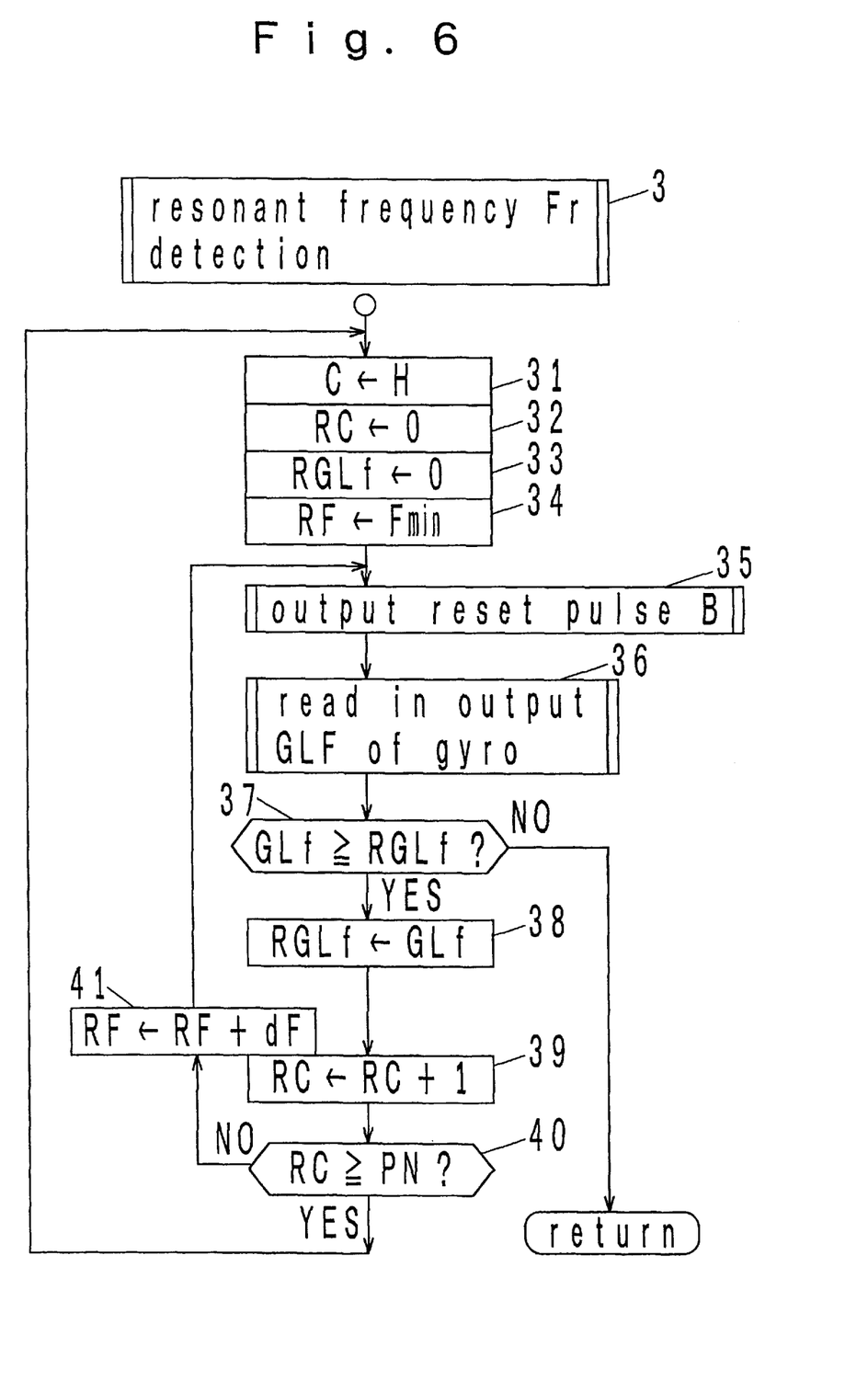
FIG. 6 is a flow chart showing a step 3 in FIG. 5 in detail.

Referring to FIG. 6, "resonant frequency Fr detection" (step 3) will be described in detail. Initially, the level of the mode indication signal C to AND gates 39, 42 is set to high H (step 31), and a register RC for counting up a number of increment of the frequency Df is cleared (step 32). A register RGLf for storing the maximum peak of the signal GLf is cleared (step 33), and a predetermined minimum value data Fmin is written into a frequency register RF and the data Fmin is supplied to the D/A converter 36 as the frequency indication data Df (step 34). Then a single reset pulse B is supplied to the synchronized detector 33 and to the flip-flop 43 (step 35).

After a predetermined delay time from the output of the reset pulse B, the angular rate signal GLf is converted to the digital data D Ω and the latter is stored in a register in CPU 35 (step 36). The delay time corresponds to a rising up time between the initiation of the free damped oscillation of the oscillator 5 and a saturation of the voltage level of the smoothing capacitor in the low pass filter in the synchronized detector 33 up to a level which corresponds to the level of the free damped oscillation. To say precisely, the rising up time varies with a variation of the frequency of the free damped oscillation. The delay time is designed so as to coincide with the rising up time at a center frequency in a frequency range of Fmin to Fmin+PN.dF.

Subsequently, CPU 35 examines if the data D Ω exceeds the data in the register RGLf (step 37). If the answer is YES, the data D Ω is written into the register RGLf (step 38). Then the data in the register RC is incremented by one (step 39)

and an examination is made to see if the data in the register RC is equal to a predetermined value PN (step 40). If the answer is NO, the data in the frequency register RF is incremented by a predetermine minimum unit dF and thus incremented frequency data is supplied to the D/A converter 36 (step 41).

Then a single pulse B is supplied again to the synchronized detector 33 and flip-flop 43 (step 35). The steps 35 to 41 are executed repeatedly and the frequency Df is incremented by dF sequentially as far as the data D Ω read in the step 36 exceeds the data in the register RGLf.

The frequency Df approaches to the resonant frequency in the z-direction of the oscillator 5 and when the frequency Df exceeds the resonant frequency by the increment of dF, the data D Ω exceeds the data in the register RGLf. CPU 35 then returns to a main routing (step 2 in FIG. 5), and examines the instruction signal A to see if the level of the signal A is high H (step 2). If the signal A is low L which indicates the angular rate detection, CPU 35 supplies the data (resonant frequency) in the frequency register RF to the D/A converter 36 and inverts the level of the mode indication signal D from high H to low L (angular rate detection). Then the oscillator 5 oscillates in the x-direction with the resonant frequency indicated by the data in the register RF. Thus the angular rate Ω detection (step 4) is executed with the resonant frequency of the oscillator 5.

During periodic execution of the angular rate Ω detection (the digital conversion of the angular rate signal GLf to the data D Ω and output of the data D Ω) of step 4, CPU 35 examines if the level of the signal A is inverted from low L to high H (step 2).

If the signal A is inverted to high H, CPU 35 executes the resonant frequency Fr detection (step 3), which is continuously or repeatedly executed when the signal A remains high H and the latest resonant frequency is stored in the frequency register RF. When the signal A is inverted from high H to low L, the latest resonant frequency data in the register RF is supplied to the D/A converter 36 for driving the oscillator 5 in the x-direction with the resonant frequency and the angular rate Ω detection (step 4) is executed repeatedly during high H of the signal A.

The execution of the resonant frequency Fr detection (step 3) updates the frequency instruction data in the frequency register RF to the latest resonant frequency of the oscillator 5.

In the embodiment as described, the oscillation frequency is incremented by dF in the resonant frequency Fr detection (step 3). However the operation can be altered so that the CPU 35 decrements the oscillation frequency by dF repeatedly from a start value of Fmin+PN.dF.

In addition, if the range Fmin to Fmin+PN.dF is relatively wide and/or the minimum unit dF is relatively large, it is preferable to execute a second resonant frequency detection in which the inspection range is narrow and centered at Fr which is the resonant frequency determined by a first detection or the Fr detection (step 3) as described, and a minimum unit dFm for the increment or decrement of the frequency is smaller than dF.

Second Embodiment

Figure 7:
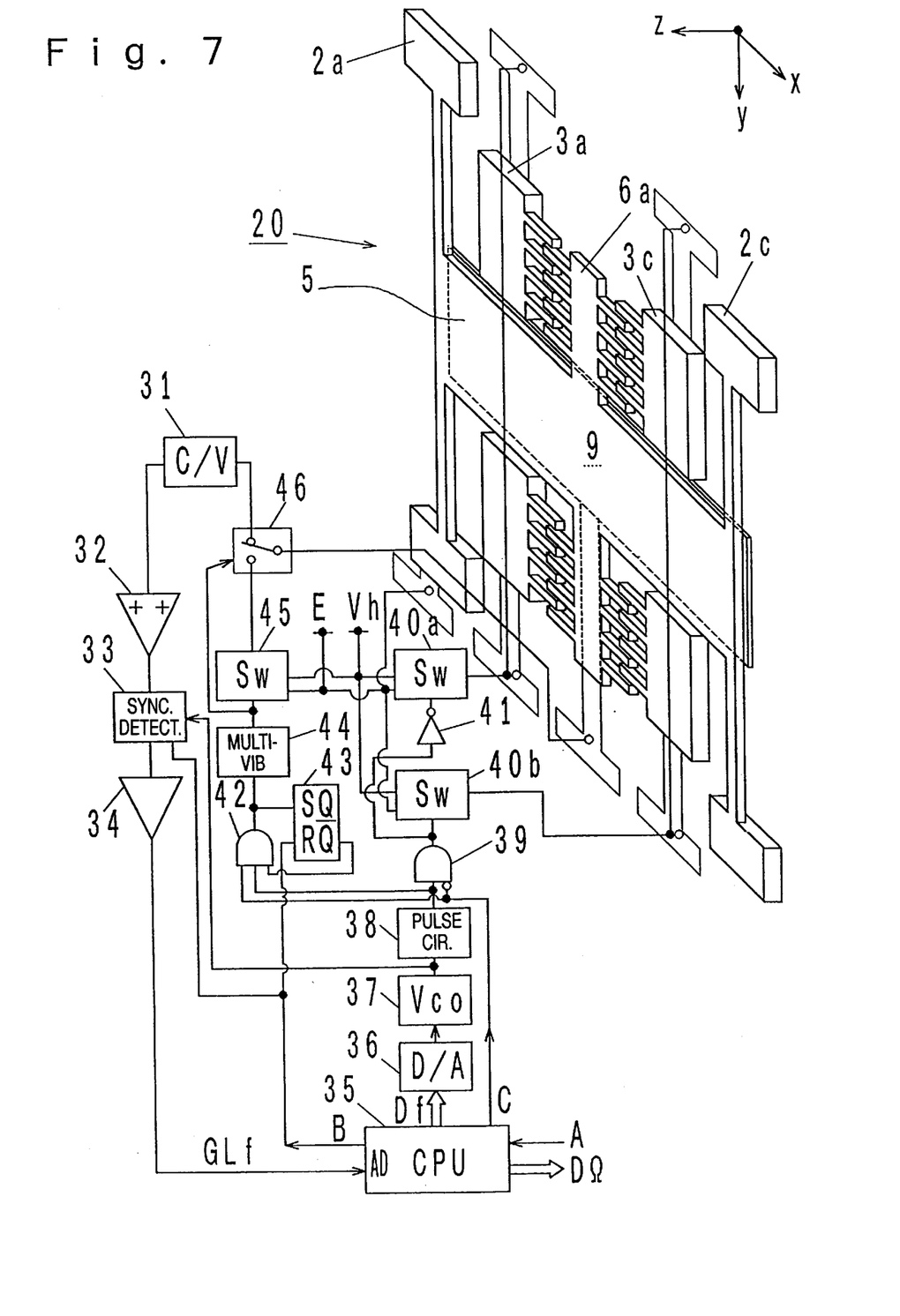
FIG. 7 shows a perspective view of a gyro 20 of a second embodiment of the invention and a block diagram of an electric circuit which is connected to the gyro 20 of the second embodiment.

Referring to FIG. 7 which shows a second embodiment of the invention, a microgyro 20 in the second embodiment has an electrode 9 which corresponds to an integral combination of the three electrodes 9a, 9b and 9c in the first embodiment shown in FIGS. 1 and 4. The other elements and construction of the microgyro 20 of the second embodiment are the same with that of the microgyro 20 of the first embodiment.

The electrode 9 of the second embodiment is for capacitance detection and for z-driving of the oscillator 5. An additional switching circuit 46 connects the electrode 9 to the switching circuit 45 or to a C/V converter 31 selectively. The operation of the CPU 35 shown in FIG. 7 is the same with that of the CPU 35 shown in FIG. 4. According to the second embodiment, the switching circuit 46 responding to high H of the output of the multivibrator 44 connects the electrode 9 to the switching circuit 45, whereby the high voltage Vh is applied to the electrode 9 which in turn attracts the oscillator 5 in the z-direction. When the output of the multivibrator 44 turns to low L, the switching circuit 46 connects the electrode 9 to the C/V converter 31. The oscillator 5 oscillates in the free damped oscillation mode, and the output capacitance detection signal of the C/V converter 31 alters its level responding to the free damped oscillation.

Third Embodiment

Figure 8:
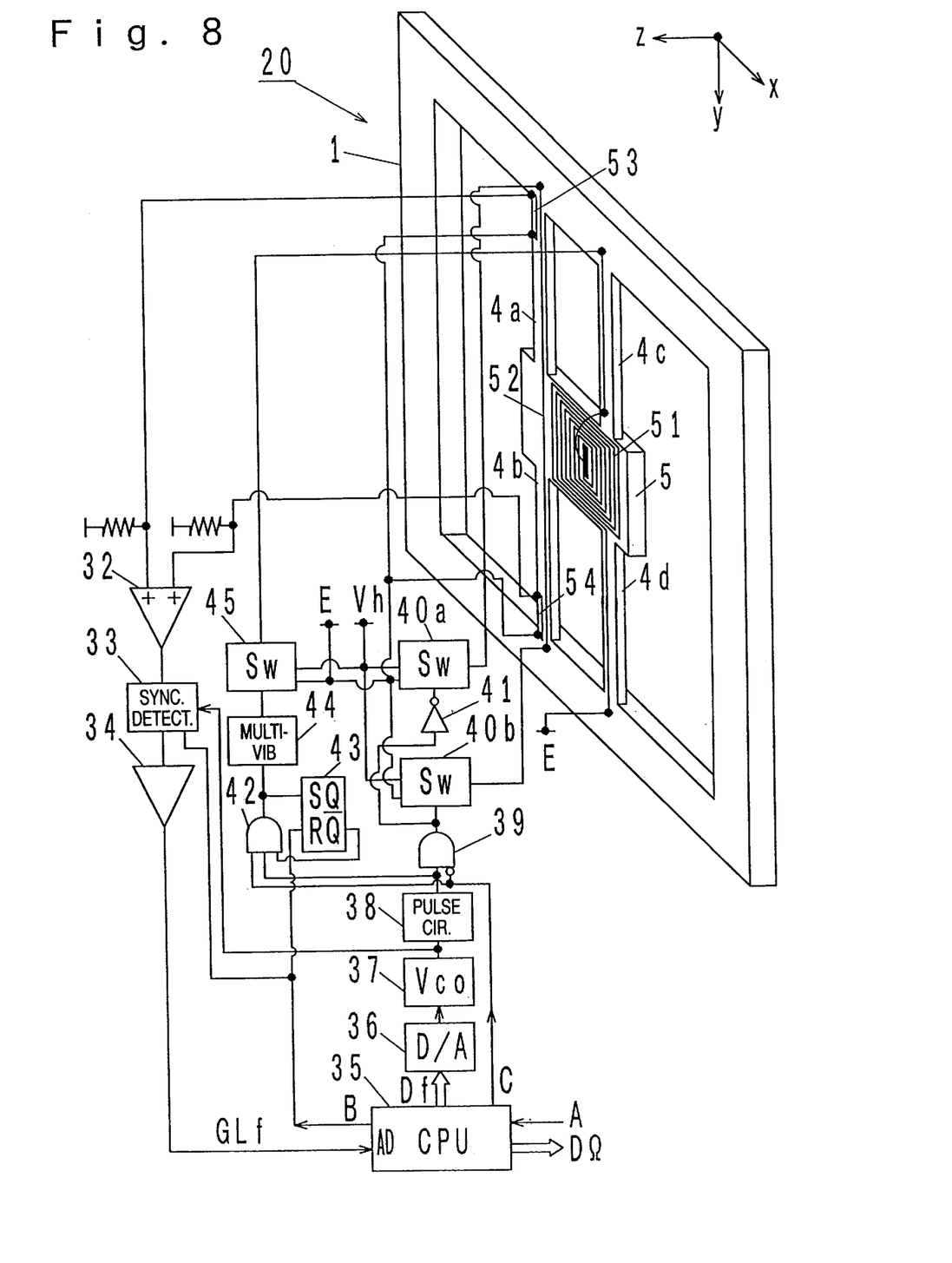
FIG. 8 shows a perspective view of a portion of a gyro 20 of a third embodiment of the invention and a block diagram of an electric circuit which is connected to gyro 20 of the third embodiment.
Figure 9:
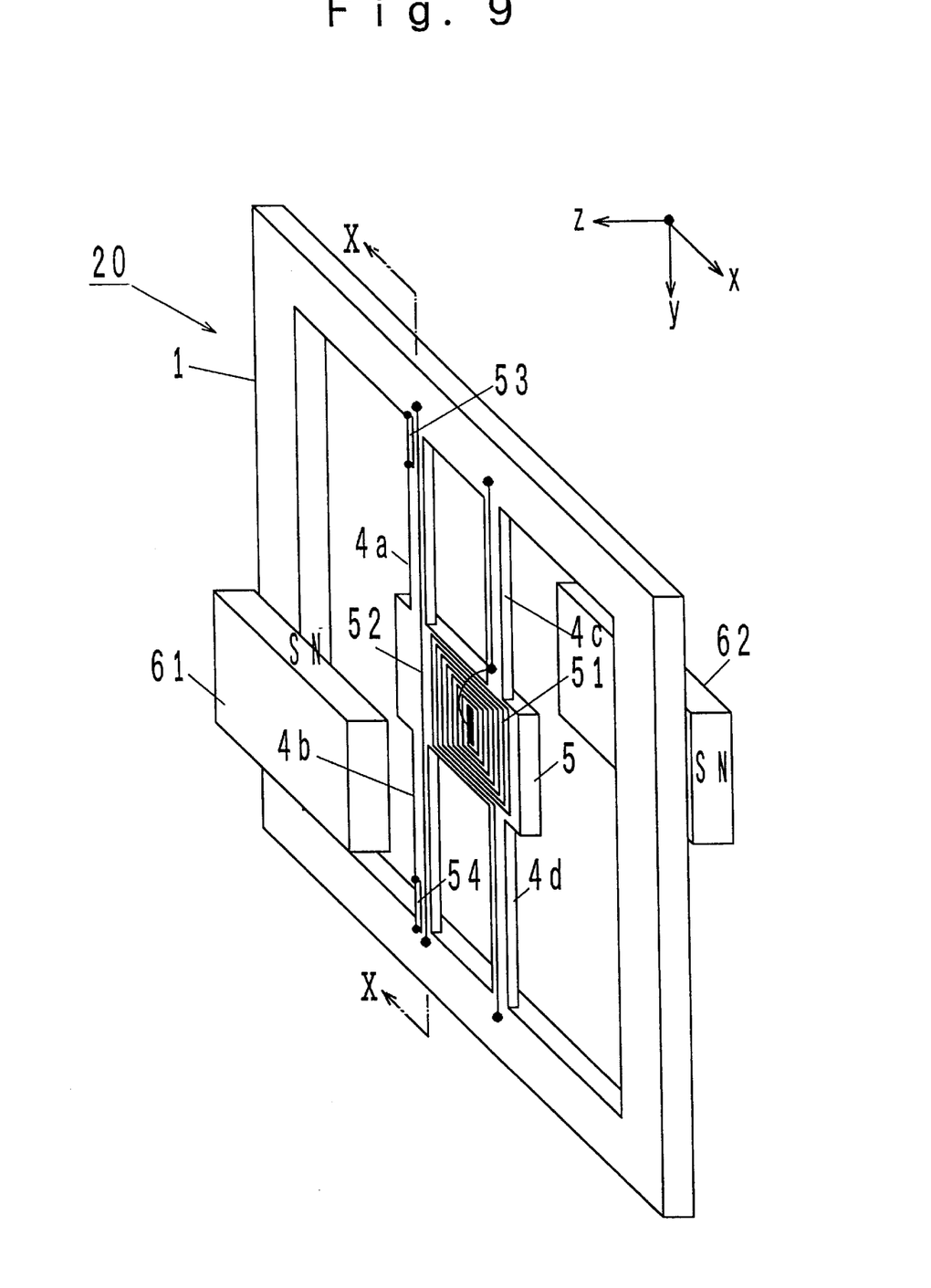
FIG. 9 shows a perspective view of main elements of the gyro 20 of the third embodiment shown in FIG. 8.

Referring to FIG. 8 which shows a third embodiment of the invention, a microgyro 20 has an oscillator 5 having a conductor wire 52 which extends in the y-direction and a conductor coil 51 in a shape of a rectangular eddy on a surface of the oscillator 5. A pair of permanent magnet sheets 61, 62 shown in FIGS. 9 and 10 are disposed so as to put the oscillator 5 therebetween.

Support beams 4a to 4d which are formed continuous with the oscillator 5 are also continuous with the silicon substrate 1. After covering a surface of the oscillator 5 with an insulator, the conductor wire 52 and the conductor coil 51 are formed on the surface by a gold deposition. Thereafter the wire 52 and the coil 51 are covered with an insulator. Then strain sensors 53 and 54 are formed by a deposition of strain sensitive resistor on the support beams 4a and 4b respectively at their flexible position which is most deformable with respect to the displacement of the oscillator 5 in the z-direction.

Figure 10:
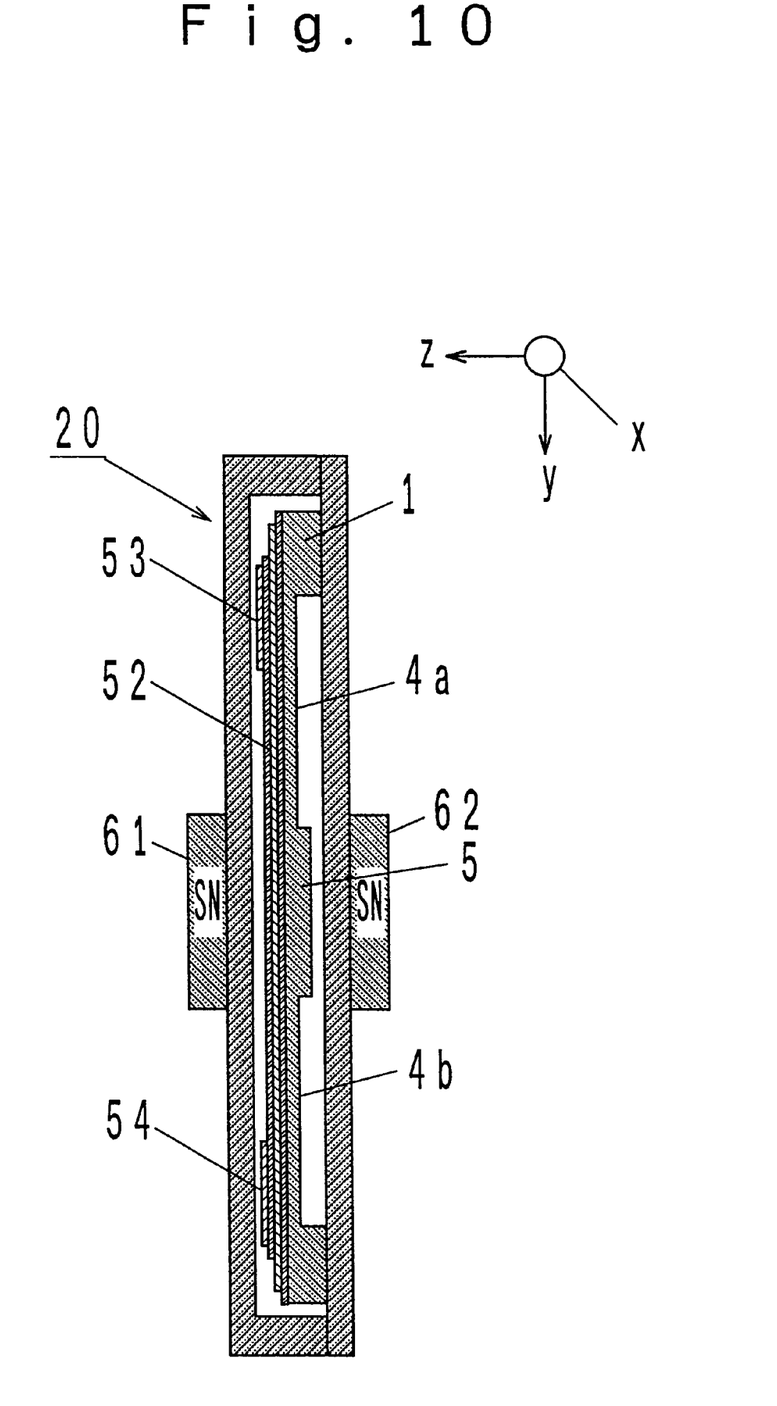
FIG. 10 is a cross section of the gyro 20 shown in FIG. 9, taken along the line X—X shown in FIG. 9.

The permanent magnet sheets 61 and 62 are magnetized in the z-direction as shown in FIG. 10 and disposed on an upper and lower plates of a casing not shown respectively. The N pole of the sheet 61 opposes to the S pole of the sheet 62. There is the conductor coil 51 (oscillator 5) between the N pole of the sheet 61 and the S pole of the sheet 62. When a current flows in the conductor coil 51 and the latter generates a magnetic field which induces S pole toward the sheet 61 and N pole toward the sheet 62, the conductor coil 51 (oscillator 5) is attracted by the magnet sheet 61 and 62 at the same time. However since the conductor coil 51 is close to the sheet 61, the conductor coil 51 is attracted by the magnet sheet 61 and moves toward the sheet 61. When the current is interrupted after the movement, the oscillator 5 flits back and oscillates in the free damped oscillation mode in the z-direction with a resonant frequency of the oscillator 5. The resistance of the strain sensors 53, 54 varies in accordance with the free damped oscillation.

Referring to FIG. 8, a constant voltage is applied to resistors which are connected to the strain sensors 53, 54 for potential dividing. Voltages across the strain sensors 53, 54 which vary with the variation of the resistances (the free damped oscillation) are applied to the adder 32. The variation of the resistances are synchronized with the oscillation of the oscillator 5 and are the same direction. Thus the adder 32 generates an analog voltage, the level of which varies in synchronism with the oscillation of the oscillator 5. The switching circuit 45 applies to the conductor coil 51 a voltage for supplying the current which drives the oscillator 5 (conductor coil 51) in the z-direction as described above.

The oscillator 5 is driven to oscillate in the x-direction by applying an a.c. voltage to the conductor wire 52 through the switching circuits 40a and 40b. An a.c. current flows in the conductor wire 52 by the application of the a.c. voltage to the conductor wire 52. When the a.c. current flows along y-direction as indicated by arrow in FIG. 8, an electromagnetic force is generated between the magnetic field applied by the permanent magnet sheets 61, 62 and the conductor wire 52 as well known as Fleming's left-hand rule. The electromagnetic force drives the conductor wire 52 (oscillator 5) along the x-direction as indicated by an arrow in FIG. 8. When the direction of the a.c. current is inverted, the conductor wire 52 (oscillator 5) is driven in a reverse direction. Accordingly, the oscillator 5 oscillates in the x-direction by applying the a.c. voltage to the conductor wire 52 through the switching circuit 40a, 40b. The frequency of the oscillation is the same with that of the a.c. voltage.

The electric circuit elements including the adder 32 to the switching circuit 45 shown in FIG. 8 and operation of them are the same with that in the first embodiment (FIG. 4). Thus description of them are omitted.

While preferred embodiments of the invention have been shown and described above, a number of changes and modifications are possible therein. Accordingly, it is not intended that the invention be limited to the specific construction or arrangement disclosed herein, but that the right is reserved to all changes and modifications coming within the scope of invention defined by the appended claims.

What is claimed is:

1. An angular rate sensing device comprises:
   an angular rate sensor having a base, an oscillator supported by the base so as to be oscillatable in x-and z-directions, a first driving means for driving the oscillator for oscillation in the x-direction, a second driving means for driving the oscillator for oscillation in the z-direction, and oscillation converting means for generating a first electric signal whose level oscillates in accordance with the oscillation in the z-direction;
   synchronizing signal generating means for generating a synchronizing signal of an indicated frequency;
   a first exciting means for supplying a first energizing voltage which is synchronized with the synchronizing signal to the first driving means;
   a second exciting means for supplying a second energizing voltage to the second driving means for driving the oscillator in the z-direction;
   amplitude detection means for generating a second electric signal which indicates an amplitude of a signal component which has a frequency of substantially the same with that of the synchronizing signal and which is in the first electric signal; and
   frequency detecting means for supplying the second energizing voltage to the second driving means through the second exciting means and for detecting the resonant frequency of the oscillator from the amplitude of the second electric signal.

2. An angular rate sensing device according to claim 1 in which the oscillation converting means in the angular rate sensor includes electrodes opposed to the oscillator in the z-direction with a gap therebetween, and the level of the first electric signal corresponds to a capacitance between the oscillator and the electrodes.

3. An angular rate sensing device according to claim 2 in which the electrodes includes first electrodes and a second electrode, the amplitude detecting means is connected to the first electrodes, and the second exciting means applies the second energizing voltage to the second electrode.

4. An angular rate sensing device according to claim 3 in which the first driving means includes a plurality of electrodes in the form of comb for an electrostatic driving.

5. An angular rate sensing device according to claim 2 in which the device further comprises switching means for connecting the electrode means to the amplitude detecting means and the second exciting means selectively, and the frequency searching means connects the electrode means to the second exciting means through the switching means when the frequency searching means supplies the second driving voltage to the electrode means through the second exciting means.

6. An angular rate sensing device according to claim 1 in which the first driving means includes electromagnetic driving means.

7. An angular rate sensing device according to claim 6 in which the electromagnetic driving means includes a conductor which is disposed on the oscillator and extends in a y-direction and means for applying a magnetic field in a z-direction to the oscillator, and the first exciting means applies the first driving a.c. voltage to the conductor.

8. An angular rate sensing device according to claim 7 in which the second driving means includes a conductor coil which is disposed on the oscillator and is circulating about z-axis, and means for applying to the conductor coil a magnetic field in the z-direction.

9. An angular rate sensing device according to claim 8 in which the oscillation converting means includes a strain sensor disposed on a support beam which is continuous with the oscillator and movable in the x- and y-direction.

10. An angular rate sensing device according to claim 1 in which the frequency detecting means determines a frequency of the oscillation of the oscillator which corresponds to the maximum peak of the second electric signal by shifting the indicated frequency to the synchronizing signal generating means.

11. An angular rate sensing device according to claim 10 in which the frequency detecting means repeats application of a single pulse of the second energizing voltage to the second driving means through the second exciting means for driving the oscillator in the z-direction, reading in the second electric signal which corresponds to an oscillation triggered by the signal pulse, and shifting the indicated frequency, in this order.

* * * * *